United States Patent
Fohn et al.

(10) Patent No.: US 11,405,401 B2
(45) Date of Patent: Aug. 2, 2022

(54) DETERMINING AND APPLYING ASSURANCE LEVELS FOR APPLICATION OPERATIONS SECURITY

(71) Applicant: ADP, Inc., Roseland, NJ (US)

(72) Inventors: Steffen Fohn, Lexington, NC (US); Mitchel Maio, Moorpark, CA (US); Juan Andrade, Morristown, NJ (US)

(73) Assignee: ADP, Inc., Roseland, NJ (US)

( * ) Notice: Subject to any disclaimer, the term of this patent is extended or adjusted under 35 U.S.C. 154(b) by 59 days.

(21) Appl. No.: 16/880,382

(22) Filed: May 21, 2020

(65) Prior Publication Data

US 2021/0367946 A1 Nov. 25, 2021

(51) Int. Cl.
H04L 9/40 (2022.01)

(52) U.S. Cl.
CPC ........ H04L 63/102 (2013.01); H04L 63/0869 (2013.01); H04L 63/105 (2013.01)

(58) Field of Classification Search
CPC .. H04L 63/102; H04L 63/0869; H04L 63/105
See application file for complete search history.

(56) References Cited

U.S. PATENT DOCUMENTS

| | | | | |
|---|---|---|---|---|
| 6,023,765 A * | 2/2000 | Kuhn | ................. | G06F 21/6218 713/166 |
| 7,039,951 B1 * | 5/2006 | Chaudhari | .............. | G10L 17/06 340/5.84 |
| 8,006,280 B1 * | 8/2011 | Hildebrand | ........... | H04L 9/0825 726/1 |
| 9,348,876 B1 * | 5/2016 | Paranjpe | ............ | G06F 16/24575 |
| 10,032,326 B1 * | 7/2018 | Landers, Jr | ........ | G06K 9/00228 |
| 2004/0015701 A1 * | 1/2004 | Flyntz | ..................... | H04L 63/08 713/182 |
| 2004/0044655 A1 * | 3/2004 | Cotner | .................... | G06F 16/21 |
| 2004/0139349 A1 * | 7/2004 | Henn | ...................... | H04L 29/06 726/1 |
| 2006/0059117 A1 * | 3/2006 | Tolson | .................. | G06F 21/604 |
| 2007/0271282 A1 * | 11/2007 | Boren | ....................... | G06F 8/34 |
| 2010/0175112 A1 * | 7/2010 | Loeb | .................... | H04L 63/101 726/4 |

(Continued)

OTHER PUBLICATIONS

Bolten, J.B. Office of Management and Budget. (2003). Memorandum to the Heads of All Departments and Agencies; 17 pages.

*Primary Examiner* — Jason Chiang
(74) *Attorney, Agent, or Firm* — Yee & Associates. P.C.

(57) ABSTRACT

A system and method of providing security for an application. A request to use an application to perform an operation using information is received from an operator by a computer system. In response to receiving the request, an operator identity assurance level of the operator and characteristics of the operation using the information are determined. An operation assurance level for the operation is determined based on the characteristics of the operation using the information. It is determined whether the operator identity assurance level of the operator satisfies the operation assurance level for the operation. The operator is allowed to use the application to perform the operation using the information in response to a determination that the operator identity assurance level of the operator satisfies the operation assurance level for the operation.

18 Claims, 6 Drawing Sheets

(56) References Cited

U.S. PATENT DOCUMENTS

| | | | |
|---|---|---|---|
| 2010/0251360 A1* | 9/2010 | Sinclair | G06F 21/34 |
| | | | 726/19 |
| 2011/0254659 A1* | 10/2011 | Bowen | H04W 12/082 |
| | | | 340/5.6 |
| 2013/0122864 A1* | 5/2013 | Haggerty | H04W 12/069 |
| | | | 455/411 |
| 2014/0143843 A1* | 5/2014 | Scaife | G06F 21/51 |
| | | | 726/5 |
| 2014/0304764 A1* | 10/2014 | Banerjee | H04L 63/02 |
| | | | 726/1 |
| 2014/0351924 A1* | 11/2014 | Myers | H04L 63/0435 |
| | | | 726/15 |
| 2014/0373104 A1* | 12/2014 | Gaddam | H04L 63/105 |
| | | | 726/4 |
| 2015/0358306 A1* | 12/2015 | Adams | H04L 63/04 |
| | | | 726/3 |
| 2015/0365423 A1* | 12/2015 | Prokopi | G06F 21/316 |
| | | | 713/152 |
| 2016/0132686 A1* | 5/2016 | Peng | G06F 21/6218 |
| | | | 726/28 |
| 2018/0007053 A1* | 1/2018 | Grant | H04L 63/101 |
| 2018/0270248 A1* | 9/2018 | Bradley | G06F 16/9535 |

\* cited by examiner

DETERMINING AND APPLYING ASSURANCE LEVELS FOR APPLICATION OPERATIONS SECURITY

BACKGROUND INFORMATION

1. Field

The present disclosure relates generally to systems and methods for providing security for an application by controlling who may use the application to perform an operation. More particularly, the present disclosure relates to a method and apparatus for providing security for an application using assurance levels for an operator and for an operation using information that the operator requests to perform using the application.

2. Background

Businesses and other organizations may provide or make use of various computer-implemented applications for performing various operations. Operators may access the functionality of such applications through application programming interfaces, APIs. Application programming interfaces enable the integration of applications internally, between applications of a particular organization, and externally, between applications of more than one different organizations.

Operators may use applications to perform operations that access or manipulate various types of information. Such information may range from public information to confidential organization and personal information. Access to and manipulation of confidential information via an application should be properly secured. One important aspect of securing an application is operator identify assurance. Operator identity assurance includes ensuring that an operator using an application is authorized to use the application to perform an operation.

Operator identity assurance may be provided by assigning assurance levels to various different operator roles. Authorizations to access applications to perform various operations may be assigned to each role. A role that has a greater set or higher level of assigned authorizations may require a greater level of identity assurance. Operator authentication requirements and methods may be established that are appropriate for the level of identity assurance associated with a particular role.

Accordingly, it would be beneficial to have a method and apparatus that take into account one or more of the issues discussed above as well as possibly other issues.

SUMMARY

An embodiment of the present disclosure provides a method of providing security for an application. A request to use an application to perform an operation using information is received from an operator by a computer system. In response to receiving the request, an operator identity assurance level of the operator and characteristics of the operation using the information are determined. An operation assurance level for the operation is determined based on the characteristics of the operation using the information. It is determined whether the operator identity assurance level of the operator satisfies the operation assurance level for the operation. The operator is allowed to use the application to perform the operation using the information in response to a determination that the operator identity assurance level of the operator satisfies the operation assurance level for the operation.

Another embodiment of the present disclosure provides a method of providing security for an application. A request to use an application to perform an operation using information is received from an operator by a computer system. In response to receiving the request, an operator identity assurance level of the operator and characteristics of the operation using the information are determined. Determining the characteristics of the operation using the information comprises determining a sensitivity level of the information, determining how the information will be used by the operation, determining an owner of the information, and determining a relationship between the operator and the owner of the information. An operation assurance level for the operation is determined based on the characteristics of the operation using the information. It is determined whether the operator identity assurance level of the operator satisfies the operation assurance level for the operation. The operator is allowed to use the application to perform the operation using the information in response to a determination that the operator identity assurance level of the operator satisfies the operation assurance level for the operation.

Yet another embodiment of the present disclosure provides an apparatus for providing security for an application comprising a receiver, an operator identifier, an operation assurance level identifier, and an assurance level verifier. The receiver is configured to receive a request from an operator to use an application to perform an operation using information. The operator identifier is configured to determine an operator identity assurance level of the operator in response to receiving the request. The operation assurance level identifier is configured to determine characteristics of the operation using the information in response to receiving the request and an operation assurance level for the operation based on the characteristics of the operation using the information. The assurance level verifier is configured to determine whether the operator identity assurance level of the operator satisfies the operation assurance level for the operation and to allow the operator to use the application to perform the operation using the information in response to a determination that the operator identity assurance level of the operator satisfies the operation assurance level for the operation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
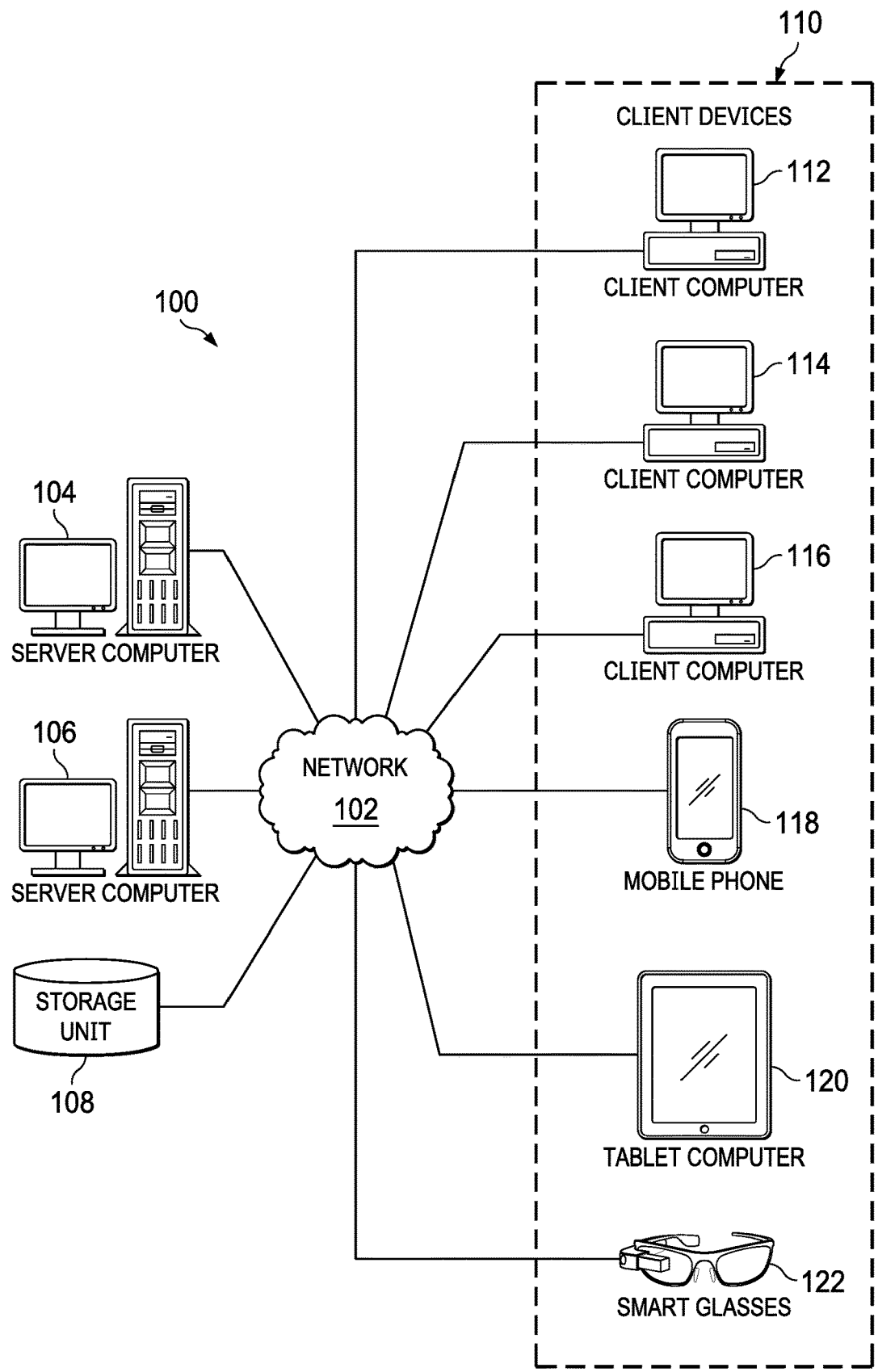
FIG. 1 is a pictorial representation of a network of data processing systems in which illustrative embodiments may be implemented.

The illustrative embodiments recognize and take into account one or more different considerations. For example, the illustrative embodiments recognize and take into account that a current method of providing application security comprises assigning assurance levels to operator roles. In this case, an operator in a particular role may be allowed to access all applications and perform all operations that are authorized for the particular role. Individual specific operations performed by a specific operator currently are not assessed to ensure that the assurance level of the operator meets the required assurance level for a particular operation.

The illustrative embodiments provide a system and method for verifying that the identity assurance level of an operator satisfies the required identity assurance level for a particular operation that the operator desires to perform using a particular application. Illustrative embodiments derive and assign an operation assurance level for a particular operation to be performed at run-time, in response to a request from an operator to perform the operation. The operation assurance level is compared to the operator identity assurance level of the operator that is requesting to perform the operation. The operator is allowed to use the application to perform the requested operation only if it is verified that the operator identity assurance level of the operator satisfies the operation assurance level of the operation to be performed.

In accordance with an illustrative embodiment, the operation assurance level of an operation to be performed may be determined at run-time by determining various characteristics of the operation. Such characteristics may include the sensitivity level of the information to be used by the operation, how the information will be used by the operation, the owner of the information, and the relationship between the owner of the information and the operator that is requesting to perform the operation.

In accordance with one example of an illustrative embodiment, the characteristics of the operation may be used to classify the operation into a use case profile. The operation assurance level for the operation then may be assigned as a pre-determined required operation assurance level for the use case profile.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

As used herein, "a number of" when used with reference to items, means one or more items. For example, "a number of different types of networks" is one or more different types of networks.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. As depicted, client devices 110 include client computer 112, client computer 114, and client computer 116. Client devices 110 can be, for example, computers, workstations, or network computers. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

Network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
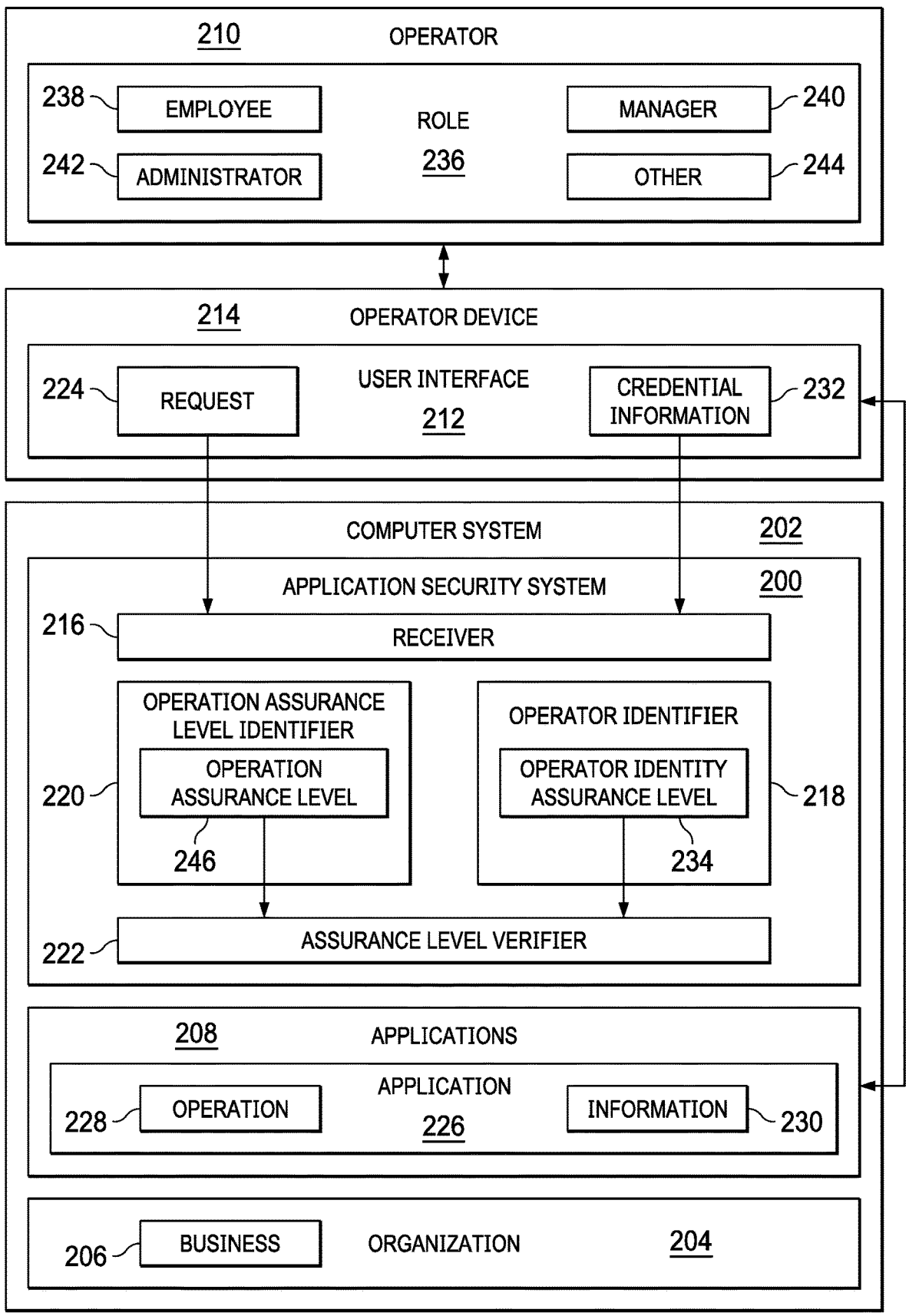
FIG. 2 is an illustration of a block diagram of an application security system in accordance with an illustrative embodiment.

Turning to FIG. 2, an illustration of a block diagram of an application security system is depicted in accordance with an illustrative embodiment. Application security system 200 may be implemented in a computer system, such as network data processing system 100 in FIG. 1.

In this illustrative example, application security system 200 is implemented using computer system 202. Computer system 202 is a physical hardware system and includes one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

For example, without limitation, application security system 200 may be implemented in computer system 202 that is operated by or for organization 204. Organization 204 may be a business 206 or any other appropriate entity. For example, computer system 202 may be operated by organization 204 for use by business 206 or another organization.

Computer system 202 may provide various applications 208. Applications 208 may be configured to perform various operations using various types of information. For example, without limitation, applications 208 may be used to perform various operations that are related to the operation of business 206 or another organization 204.

Applications 208 may be accessed and used by operator 210 via user interface 212 on operator device 214. Operator 210 may be a human operator. User interface 212 may be implemented in any appropriate manner to allow operator 210 to interact with computer system 202, including applications 208. Operator device 214 may include any appropriate device on which user interface 212 may be implemented. For example, without limitation, operator device 214 may be implemented as one of client devices 110 in network data processing system 100 in FIG. 1.

Application security system 200 is configured to provide security for applications 208 by controlling access to use of applications 208 by operator 210. Application security system 200 comprises receiver 216, operator identifier 218, operation assurance level identifier 220, and assurance level verifier 222.

Receiver 216 is configured to receive request 224 from operator 210 to use application 226 in applications 208. Request 224 may indicate operation 228 that is to be performed using application 226 and information 230 that is to be used in performing operation 228.

Receiver 216 also may be configured to receive credential information 232. Credential information 232 may include any appropriate information that may be provided by operator 210 or from another source that may be used to validate the identity of operator 210.

Operator identifier 218 is configured to determine operator identity assurance level 234 for operator 210. Operator identity assurance level 234 indicates a level of information that operator 210 may access or modify. Operator identifier 218 may use credential information 232 for operator 210 to determine operator identity assurance level 234 for operator 210.

Operator identity assurance level 234 may be based on role 236 of operator 210. For example, without limitation, role 236 of operator 210 may be employee 238, manager 240, administrator 242, or other 244 appropriate role 236. Each different role 236 may be associated with a different appropriate operator identity assurance level 234.

Operation assurance level identifier 220 is configured to determine operation assurance level 246 for operation 228 using information 230 that is requested by operator 210 to be performed using application 226. In accordance with an illustrative embodiment, operation assurance level 246 may be determine at run-time, in response to receiving request 224 from operator 210 to use application 226. Operation assurance level 246 may be determined based on characteristics of operation 228 using information 230. A more detailed example of operation assurance level identifier 220 is described below with reference to FIG. 3.

Assurance level verifier 222 is configured to determine whether operator identity assurance level 234 of operator 210 satisfies operation assurance level 246 for operation 228. Operator 210 is allowed to use application 226 to perform operation 228 only if operator identity assurance level 234 of operator 210 satisfies operation assurance level 246.

The illustration of the different components in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
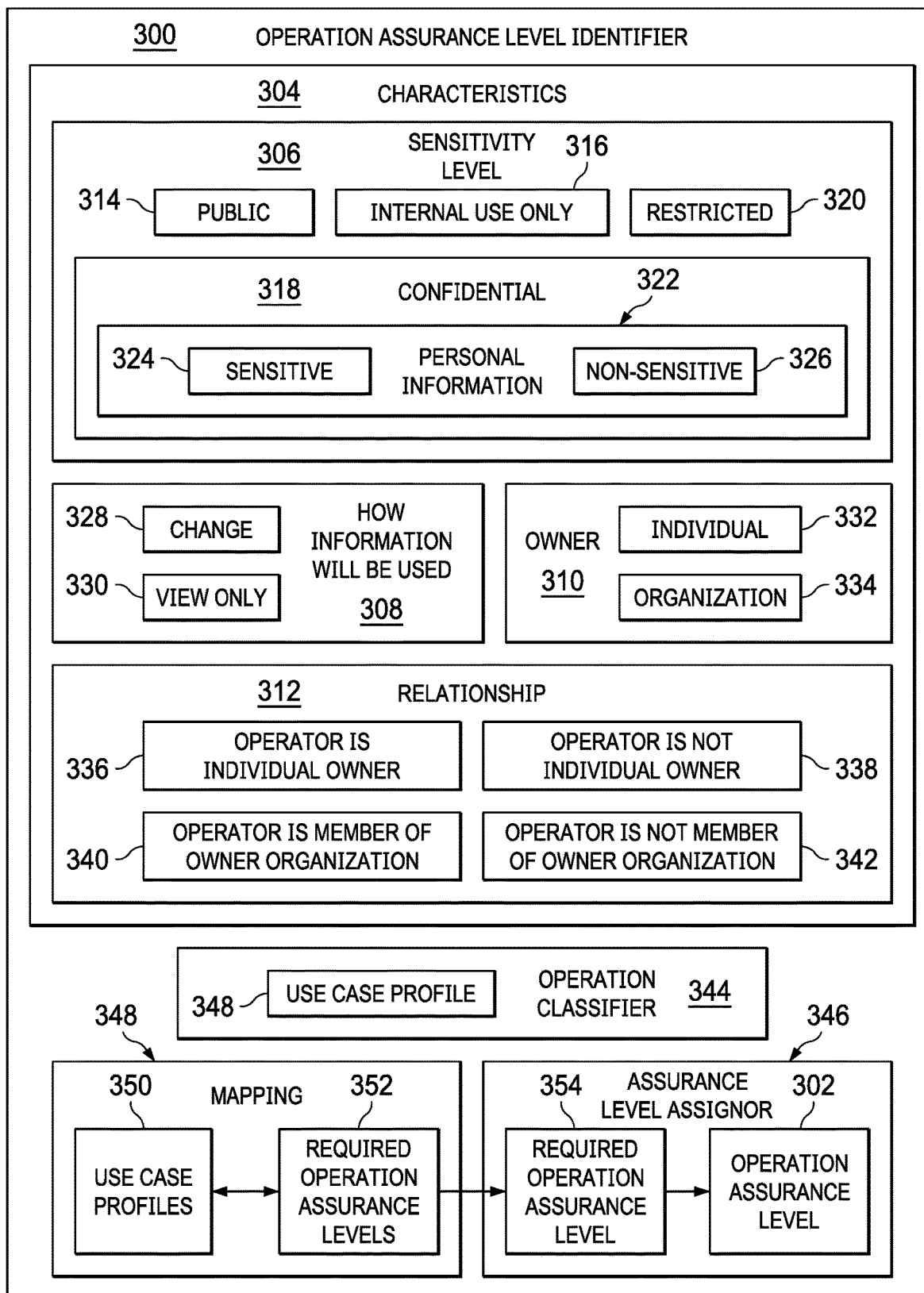
FIG. 3 is an illustration of a block diagram of an operation assurance level identifier in accordance with an illustrative embodiment.

Turning to FIG. 3, an illustration of a block diagram of an operation assurance level identifier is depicted in accordance with an illustrative embodiment. Operation assurance level identifier 300 is an example of one implementation of operation assurance level identifier 220 in FIG. 2.

Operation assurance level identifier 300 is configured to determine operation assurance level 302 for an operation using information that is requested to be performed by an operator. In accordance with an illustrative embodiment, operation assurance level 302 is determined based on characteristics 304 of the requested operation using information. Characteristics 304 may include one or more of sensitivity level 306 of the information, how the information will be used 308 by the operation, owner 310 of the information, and relationship 312 of the operator to the owner of the information. In one example, characteristics 304 may include all of sensitivity level 306 of the information, how the information will be used 308 by the operation, owner 310 of the information, and relationship 312 of the operator to the owner of the information.

Sensitivity level 306 of the information may be selected from public 314, internal use only 316, confidential 318, and restricted 320. For example, information that is confidential 318 may include personal information 322. Both sensitive 324 and non-sensitive 326 personal information 322 may be classified as confidential 318.

Sensitivity level 306 may be determined by processing the request that is received from an operator to perform an operation using information. For example, the request may comprise a request message that includes a message body and a number of parameters. The message body may comprise the information to be processed by the requested operation. The parameters may be any variables that are communicated as part of the message but are not part of the message body. The contents of the message body and message parameters may be processed using a rule or database that defines data sensitivities to identify the sensitivity level of the contents of the message body and message parameters and, therefore, sensitivity level 306 of the request from the request message.

Sensitivity level 306 also may take into account the sensitivity level of information in the response to the request that will be provided by an application performing the requested operation. For example, the response may comprise a response message that includes a message body and a number of parameters. The contents of the message body and message parameters of the response message may be processed in the same manner as the request message, to identify the sensitivity level of the contents of the message body and message parameters and, therefore, the sensitivity level of the response from the response message. Sensitivity level 306 of the information for the requested operation as a whole then may be selected as the more sensitive of the sensitivity level of the request or the sensitivity level of the response.

How the information will be used 308 by the operation may be selected from using the operation to change 328 the information or using the operation to view only 330 the information without changing the information. Owner 310 of the information may be, for example, individual 332 or organization 334. Relationship 312 of the operator to the owner of the information may be, for example, operator is individual owner 336 of the information, operator is not individual owner 338 of the information, operator is member of organization owner 340 of the information, or operator is not member of organization owner 342 of the information.

Operation assurance level identifier 300 may include operation classifier 344 and assurance level assignor 346. Operation classifier 344 may be configured to use characteristics 304 of the operation to classify the operation into use case profile 348. Assurance level assignor 346 may be configured to determine operation assurance level 302 for the operation by using pre-generated mapping 348 of use case profiles 350 to corresponding required operation assurance levels 352 to identify required operation assurance level 354 for use case profile 348. Required operation assurance level 354 then may be assigned as operation assurance level 302 for the operation.

The illustration of the different components in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
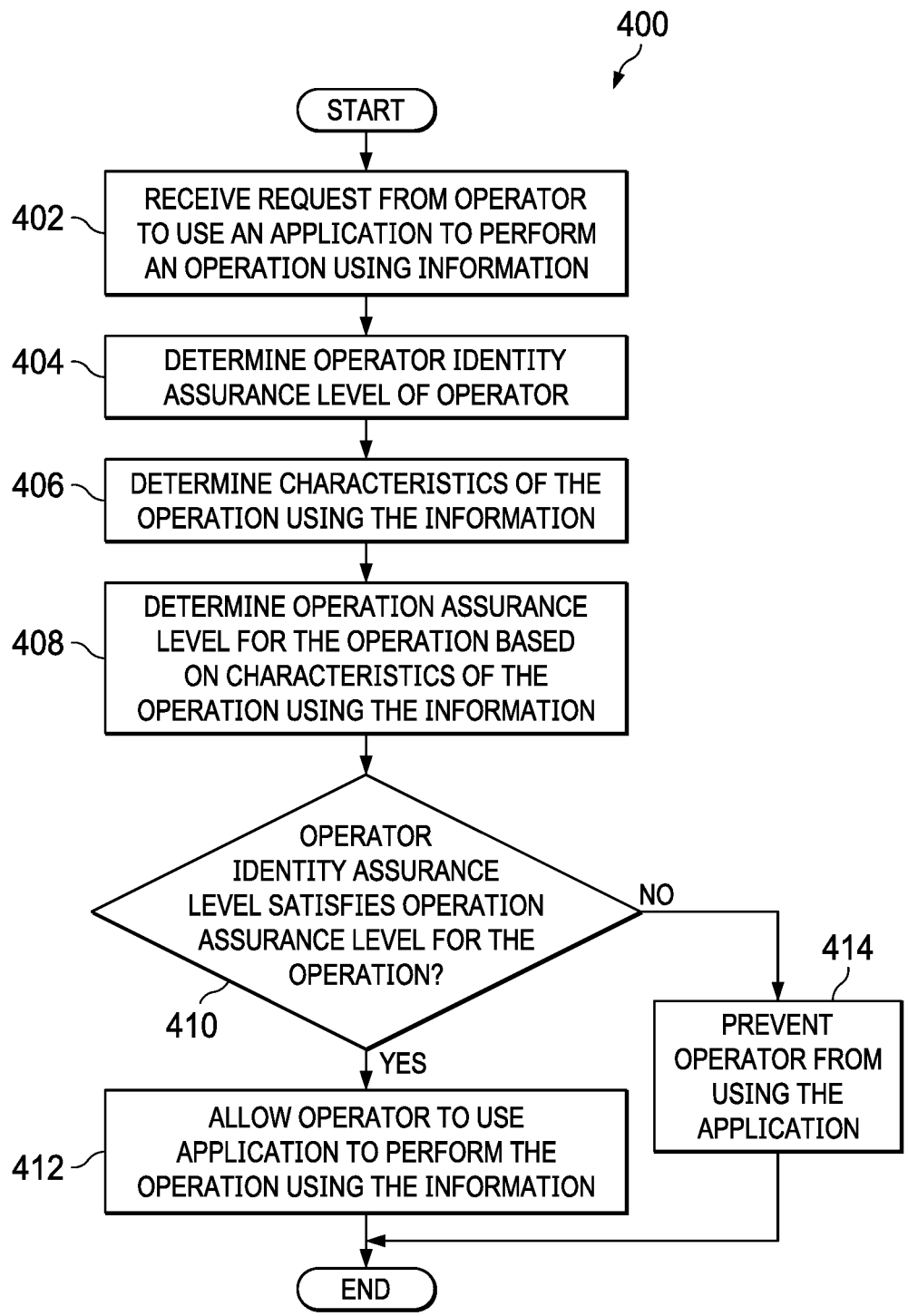
FIG. 4 is an illustration of a flowchart of a process for providing security for an application in accordance with an illustrative embodiment.

Turning to FIG. 4, an illustration of a flowchart of a process for providing security for an application is depicted in accordance with an illustrative embodiment. Process 400 may be implemented, for example, in application security system 200 in FIG. 2.

Process 400 may begin with receiving a request from an operator to use an application to perform an operation using information (operation 402). An operator identity assurance level for the operator is determine (operation 404). Characteristics of the requested operation using the information also are determined (operation 406). An operation assurance level for the operation then is determined based on the characteristics of the operation using the information (operation 408).

It then is determined whether the operator identity assurance level for the operator satisfies the operation assurance level for the operation (operation 410). If the operator identity assurance level for the operator does satisfy the operation assurance level for the operation, the operator is allowed to use the requested application to perform the operation using the information (operation 412), with the process terminating thereafter. If the operator identity assurance level for the operator does not satisfy the operation assurance level for the operation, the operator is prevented from using the requested application (operation 414), with the process terminating thereafter.

Figure 5:
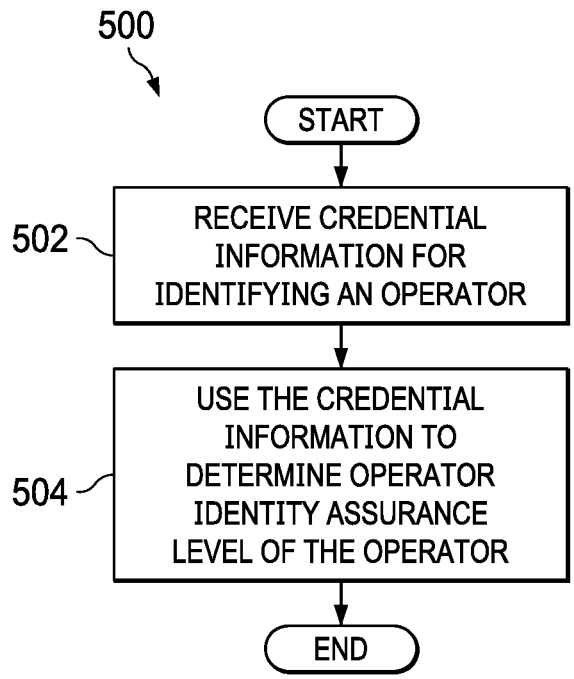
FIG. 5 is an illustration of a flowchart of a process for determining an operator identity assurance level of an operator in accordance with an illustrative embodiment.

Turning to FIG. 5, an illustration of a flowchart of a process for determining an operator identity assurance level of an operator is depicted in accordance with an illustrative embodiment. Process 500 is an example of one implementation of operation 404 in FIG. 4.

Process 500 begins with receiving credential information for identifying an operator (operation 502). The credential information is then used to determine the operator identity assurance level of the operator (operation 504), with the process terminating thereafter.

Figure 6:
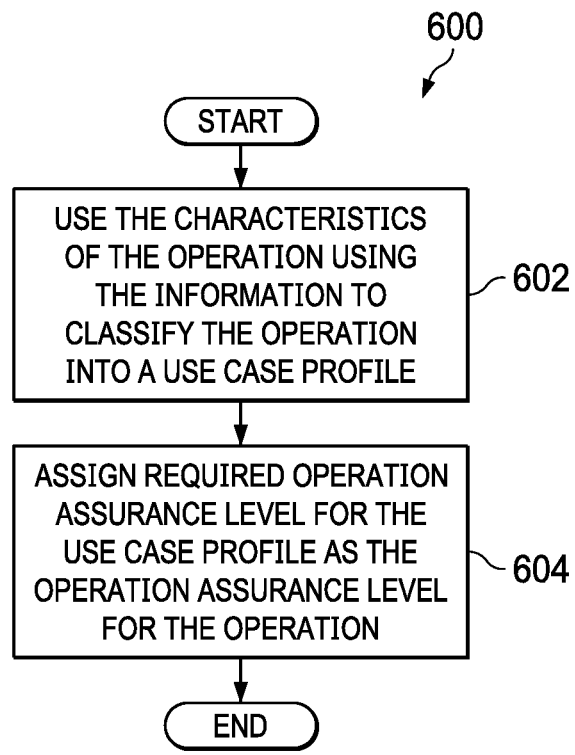
FIG. 6 is an illustration of a flowchart of a process for determining an operation assurance level of an operation in accordance with an illustrative embodiment.

Turning to FIG. 6, an illustration of a flowchart of a process for determining an operation assurance level of an operation is depicted in accordance with an illustrative embodiment. Process 600 is an example of one implementation of operation 408 in FIG. 4.

Process 600 begins with using the characteristics of the operation using the information to classify the operation into a use case profile (operation 602). A required operation assurance level for the use case profile is then assigned as the operation assurance level for the operation (operation 604), with the process terminating thereafter.

Figure 7:
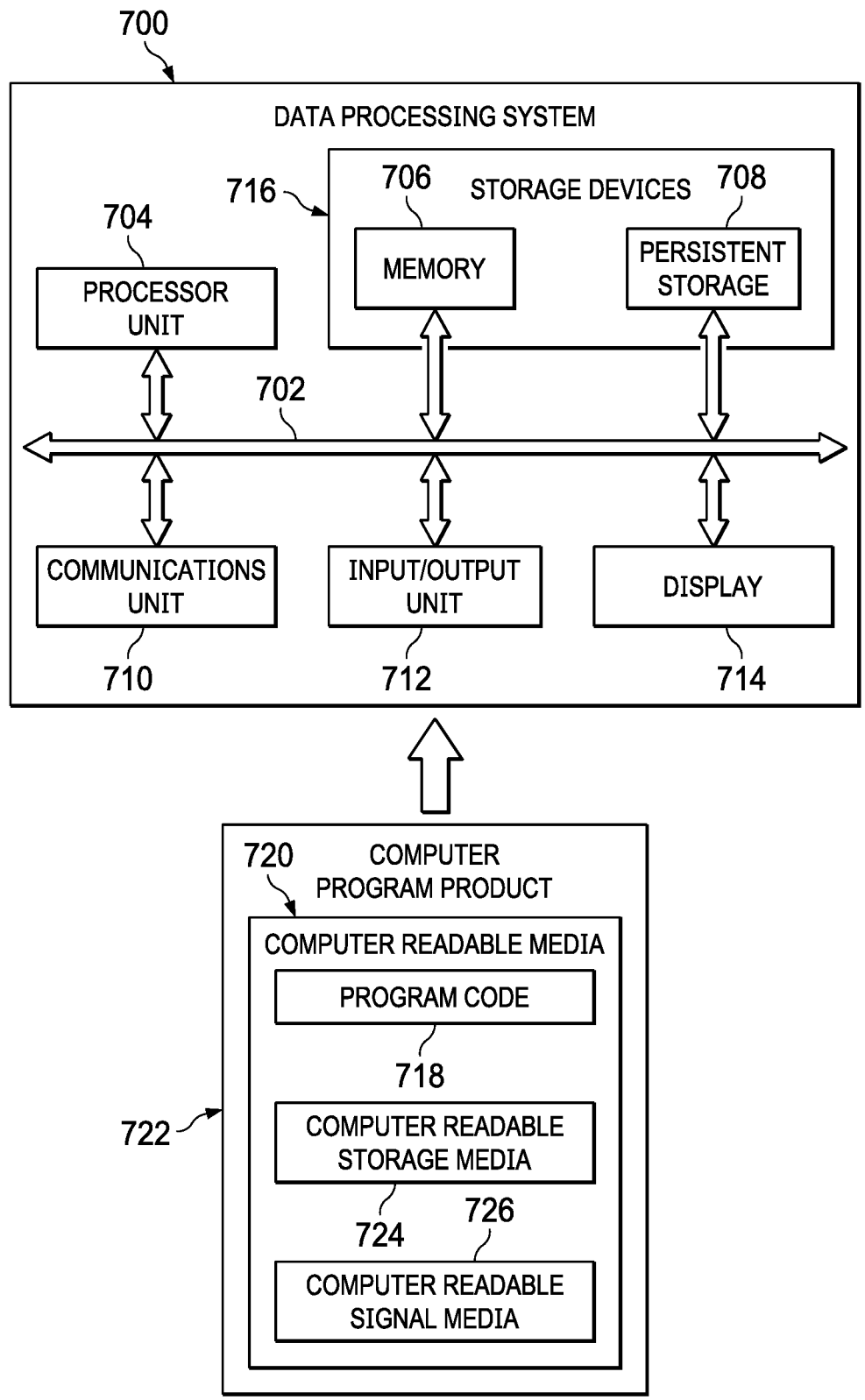
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 500 may be used to implement one or more of server computer 104 in FIG. 1, server computer 106 in FIG. 1, client devices 110 in FIG. 1, computer system 202 in FIG. 2, and operator device 214 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media" can be singular or plural. For example, program code 718 can be located in computer-readable media 720 in the form of a single storage device or system. In another example, program code 718 can be located in computer-readable media 720 that is distributed in multiple data processing systems. In other words, some instructions in program code 718 can be located in one data processing system while other instructions in program code 718 can be located in another data processing system. For example, a portion of program code 718 can be located in computer-readable media 720 in a server computer while another portion of program code 718 can be located in computer-readable media 720 located in a set of client computers.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of providing security for an application, comprising:
   receiving, by a computer system, a request from an operator to use an application to perform an operation using information;

in response to receiving the request, determining, by the computer system, an operator identity assurance level of the operator;

in response to receiving the request, determining, by the computer system, characteristics of the operation using the information;

determining, by the computer system, a sensitivity level of the request by identifying data sensitivities of the request based on contents of message in the request;

determining, by the computer system, a sensitivity level of response to the request by identifying data sensitivities of the response to the request based on contents of message in the response to the request;

determining, by the computer system, a sensitivity level for the information by selecting more sensitive of the sensitivity level of the request or the sensitivity level of the response to the request;

determining, by the computer system, an operation assurance level for the operation based on the characteristics of the operation using the sensitivity level of the information and pre-generated mapping of use case profiles to corresponding required operation assurance levels;

determining, by the computer system, whether the operator identity assurance level of the operator satisfies the operation assurance level for the operation; and in response to a determination that the operator identity assurance level of the operator satisfies the operation assurance level for the operation, allowing, by the computer system, the operator to use the application to perform the operation using the information.

2. The method of claim 1, wherein the operator identity assurance level of the operator is based on a role of the operator.

3. The method of claim 1 further comprising:
receiving, by the computer system, credential information for identifying the operator; and
determining, by the computer system, the operator identity assurance level of the operator using the credential information.

4. The method of claim 1, wherein determining the operation assurance level for the operation comprises:
using the characteristics of the operation using the information to classify the operation into a use case profile; and
assigning a required operation assurance level for the use case profile as the operation assurance level for the operation.

5. The method of claim 1, wherein determining the characteristics of the operation comprises determining how the information will be used by the operation.

6. The method of claim 1, wherein determining the characteristics of the operation comprises determining an owner of the information.

7. The method of claim 6, wherein determining the characteristics of the operation comprises determining a relationship between the operator and the owner of the information.

8. A method of providing security for an application, comprising:
receiving, by a computer system, a request from an operator to use an application to perform an operation using information;
in response to receiving the request, determining, by the computer system, an operator identity assurance level of the operator;

in response to receiving the request, determining, by the computer system, characteristics of the operation using the information, wherein the characteristics of the operation comprise:
a sensitivity level of the request determined by identifying data sensitivities of the request based on contents of message in the request,
a sensitivity level of response to the request determined by identifying data sensitivities of the response to the request based on contents of message in the response to the request,
a sensitivity level for the information determined by selecting more sensitive of the sensitivity level of the request or the sensitivity level of the response to the request;
how the information will be used by the operation,
an owner of the information, and
a relationship between the operator and the owner of the information;

determining, by the computer system, an operation assurance level for the operation based on the characteristics of the operation using the information and pre-generated mapping of use case profiles to corresponding required operation assurance levels;

determining, by the computer system, whether the operator identity assurance level of the operator satisfies the operation assurance level for the operation; and in response to a determination that the operator identity assurance level of the operator satisfies the operation assurance level for the operation, allowing, by the computer system, the operator to use the application to perform the operation using the information.

9. The method of claim 8 further comprising:
receiving, by the computer system, credential information for identifying the operator; and
determining, by the computer system, the operator identity assurance level for the operator using the credential information.

10. The method of claim 8, wherein:
determining the sensitivity level of the information comprises determining whether the information is public information, internal use only information of an organization, confidential information, or restricted information;
determining how the operation will use the information comprises determining whether the operation will change the information or only view the information;
determining the owner of the information comprises identifying an individual or an organization that owns the information; and
determining the relationship between the operator and the owner of the information comprises determining whether the operator is the individual that owns the information, an individual that does not own the information, a member of the organization, or not a member of the organization.

11. The method of claim 8, wherein determining the operation assurance level for the operation comprises:
using the characteristics of the operation using the information to classify the operation into a use case profile; and
assigning a required operation assurance level for the use case profile as the operation assurance level for the operation.

12. A system for providing security for an application, comprising:
   a computer system;
   one or more processors running on the computer system, wherein the one or more processors are configured to execute program instructions to cause the computer system to:
   receiving a request from an operator to use an application to perform an operation using information;
   in response to receiving the request, determining an operator identity assurance level of the operator;
   in response to receiving the request, determining characteristics of the operation using the information;
   determining a sensitivity level of the request by identifying data sensitivities of the request based on contents of message in the request;
   determining a sensitivity level of response to the request by identifying data sensitivities of the response to the request based on contents of message in the response to the request;
   determining a sensitivity level for the information by selecting more sensitive of the sensitivity level of the request or the sensitivity level of the response to the request;
   determining an operation assurance level for the operation based on the characteristics of the operation using the sensitivity level of the information and pre-generated mapping of use case profiles to corresponding required operation assurance levels;
   determining whether the operator identity assurance level of the operator satisfies the operation assurance level for the operation; and
   in response to a determination that the operator identity assurance level of the operator satisfies the operation assurance level for the operation, allowing the operator to use the application to perform the operation using the information.

13. The computer system of claim 12, wherein the operator identity assurance level of the operator is based on a role of the operator.

14. The computer system of claim 12, wherein the one or more processors are further configured to execute the program instructions to:
   receiving credential information for identifying the operator; and
   determining the operator identity assurance level of the operator using the credential information.

15. The computer system of claim 12, wherein determining the operation assurance level for the operation comprises:
   using the characteristics of the operation using the information to classify the operation into a use case profile; and
   assigning a required operation assurance level for the use case profile as the operation assurance level for the operation.

16. The computer system of claim 12, wherein determining the characteristics of the operation comprises determining how the information will be used by the operation.

17. The computer system of claim 12, wherein determining the characteristics of the operation comprises determining an owner of the information.

18. The computer system of claim 17, wherein determining the characteristic of the operation comprises determining a relationship between the operator and the owner of the information.

* * * * *